US012620588B2

(12) United States Patent
Noh et al.

(10) Patent No.: US 12,620,588 B2
(45) Date of Patent: May 5, 2026

(54) CATHODE ACTIVE MATERIAL PRECURSOR FOR LITHIUM SECONDARY BATTERY, CATHODE ACTIVE MATERIAL FOR LITHIUM SECONDARY BATTERY AND LITHIUM SECONDARY BATTERY

(71) Applicants: SK INNOVATION CO., LTD., Seoul (KR); SK ON CO., LTD., Seoul (KR)

(72) Inventors: Mi Jung Noh, Daejeon (KR); Jeong Bae Yoon, Daejeon (KR); Je Nam Choi, Daejeon (KR); Sang Bok Kim, Daejeon (KR); Jae Ho Choi, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 662 days.

(21) Appl. No.: 18/074,136

(22) Filed: Dec. 2, 2022

(65) Prior Publication Data

US 2023/0178726 A1 Jun. 8, 2023

(30) Foreign Application Priority Data

Dec. 7, 2021 (KR) ........................ 10-2021-0173738

(51) Int. Cl.
H01M 4/525 (2010.01)
C01G 53/40 (2025.01)
(Continued)

(52) U.S. Cl.
CPC ............ H01M 4/525 (2013.01); C01G 53/40 (2013.01); C01G 53/50 (2013.01); H01M 10/0525 (2013.01); *C01P 2002/20* (2013.01); *C01P 2002/50* (2013.01); *C01P 2002/72* (2013.01); *C01P 2002/74* (2013.01); *C01P 2002/77* (2013.01); *C01P 2002/78* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS 12,391,576 B2 * 8/2025 Zhang .................... C01G 53/50
2024/0294394 A1 * 9/2024 Park ...................... H01M 4/505

FOREIGN PATENT DOCUMENTS

CN 112687870 A 4/2021
EP 2395589 A1 * 12/2011 ............. C01G 53/82
(Continued)

OTHER PUBLICATIONS

Tran N et al: Layered Li1+x(Ni0.425Co0.15)1-x02 Positive Electrode materials for lithium-ion batteries J. Electrochem. Soc., vol. 153, 2006, pp. A261-A269, XP003024845.
(Continued)

*Primary Examiner* — Carlos Barcena
(74) *Attorney, Agent, or Firm* — IP & T GROUP LLP

(57) ABSTRACT

A cathode active material precursor for a lithium secondary battery has a structure of a nickel composite hydroxide. A first peak intensity ratio represented by Equation 1 is 0.5 or more, and a second peak intensity ratio represented by Equation 2 is 0.7 or more. A cathode active material and a lithium secondary battery having a stabilized crystal structure are provided using the cathode active material precursor.

4 Claims, 3 Drawing Sheets

(51) Int. Cl.
   C01G 53/50       (2025.01)
   H01M 10/0525     (2010.01)
   *H01M 4/02*          (2006.01)

(56)             References Cited

FOREIGN PATENT DOCUMENTS

| | | | |
|---|---|---|---|
| KR | 10-0821523 | B1 | 4/2008 |
| KR | 10-2016-0026307 | A | 3/2016 |
| KR | 10-2017-0113385 | A | 10/2017 |
| KR | 10-2021-0006869 | A | 1/2021 |
| WO | 2014/049966 | A1 | 4/2014 |
| WO | 2021073583 | A1 | 4/2021 |

OTHER PUBLICATIONS

Extended European Search Report for the European Patent Application No. 22211747.5 issued by the European Patent Office on May 15, 2023.

* cited by examiner

FIG. 4

CATHODE ACTIVE MATERIAL PRECURSOR FOR LITHIUM SECONDARY BATTERY, CATHODE ACTIVE MATERIAL FOR LITHIUM SECONDARY BATTERY AND LITHIUM SECONDARY BATTERY

CROSS-REFERENCE TO RELATED APPLICATION

This application claims priority to Korean Patent Application No. 10-2021-0173738 filed on Dec. 7, 2021 in the Korean Intellectual Property Office (KIPO), the entire disclosure of which is incorporated by reference herein.

BACKGROUND

1. Field

The present invention relates to a cathode active material precursor for a lithium secondary battery, a cathode active material for a lithium secondary battery and a lithium secondary battery. More particularly, the present invention relates to a cathode active material precursor for a lithium secondary battery containing nickel, a cathode active material for a lithium secondary battery containing lithium and nickel and a lithium secondary battery including the cathode active material.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

As an application range of the lithium secondary batteries is extended to large devices such as the electric vehicle, a high-nickel (High-Ni)-based lithium oxide having an increased nickel content is used as a cathode active material for obtaining high capacity of the lithium secondary battery. The cathode active material may be prepared by reacting a nickel-containing precursor and a lithium source.

However, a side reaction with the electrolyte and an instability of a chemical structure may be easily caused in the high-nickel-based lithium oxide to degrade a life-span and an operational stability of the lithium secondary battery. Thus, a structural stability of the nickel-containing precursor may be needed to enhance a stability of the cathode active material.

For example, Korean Registered Patent Publication No. 10-0821523 discloses a cathode active material including a high nickel-based lithium composite oxide, but fails to consider the structural stability of the nickel-containing precursor.

SUMMARY

According to an aspect of the present invention, there is provided a cathode active material precursor for a lithium secondary battery having improved structural and chemical stability.

According to an aspect of the present invention, there is provided a cathode active material for a lithium secondary battery having improved structural and chemical stability.

According to an aspect of the present invention, there is provided a lithium secondary battery including the cathode active material.

A cathode active material precursor for a lithium secondary battery has a structure of a nickel composite hydroxide. A first peak intensity ratio represented by Equation 1 is 0.5 or more, and a second peak intensity ratio represented by Equation 2 is 0.7 or more.

$$\text{first peak intensity ratio} = I(101)/I(001) \qquad \text{Equation 1}$$

$$\text{second peak intensity ratio} = I(101)/I(100) \qquad \text{Equation 2}$$

In Equations 1 and 2, I(101) and I(100) are peak intensities or maximum peak heights of (101), (001) and (100) planes, respectively, by an X-ray diffraction analysis.

In some embodiments, the structure of the nickel composite hydroxide may be represented by Chemical Formula 1.

$$\text{Ni}_{1-x-y-z}\text{Co}_x\text{Mn}_y\text{M}_z(\text{OH})_{2+a} \qquad \text{Chemical Formula 1}$$

In Chemical Formula 1, M may include at least one selected from the group consisting of Mg, Sr, Ba, B, Al, Si, Ti, Zr and W, $0.02 \leq x \leq 0.15$, $0 \leq y \leq 0.15$, $0 \leq z \leq 0.1$, and $-0.5 \leq a \leq 0.1$.

In some embodiments, a molar ratio of nickel among elements other than a hydroxyl group may be 0.8 or more.

In some embodiments, the first peak intensity ratio may be in a range from 0.5 to 1.3.

In some embodiments, the second peak intensity ratio may be in a range from 0.7 to 1.4.

A cathode active material for a lithium secondary battery has a structure of a lithium-nickel-based composite oxide and has an interlayer distance ratio of 0.80 or more defined by Equation 3.

$$\text{interlayer distance ratio} = TM \text{ slab/Li slab} \qquad \text{Equation 3}$$

In Equation 3, TM slab is a thickness of an O-TM-O layer in an octahedral structure ($\text{TMO}_6$) containing a transition metal (TM) obtained by a Rietveld method using an X-ray diffraction analysis. Li slab is a thickness of an O—Li—O layer in a Li-containing octahedral structure ($\text{LiO}_6$) obtained by the Rietveld method using the X-ray diffraction analysis.

In some embodiments, the lithium-nickel-based composite oxide may be represented by Chemical Formula 2.

$$\text{Li}_b\text{Ni}_{1-x-y-z}\text{Co}_x\text{Mn}_y\text{M}_z\text{O}_{2+a} \qquad \text{Chemical Formula 2}$$

In Chemical Formula 2, $0.02 \leq x \leq 0.15$, $0 \leq y \leq 0.15$, $0 \leq z \leq 0.1$, $-0.5 \leq a \leq 0.1$, $0.9 \leq b \leq 1.2$, and M may include at least one selected from the group consisting of Mg, Sr, Ba, B, Al, Si, Ti, Zr and W.

In some embodiments, the interlayer distance ratio may be in a range from 0.81 to 1.0.

In some embodiments, TM slab may be in a range from 2.110 Å to 2.140 Å.

In some embodiments, Li slab may be in a range from 2.580 Å to 2.620 Å.

In some embodiments, TM slab may be in a range from 2.120 Å to 2.140 Å.

In some embodiments, Li slab may be in a range from 2.590 Å to 2.610 Å.

A lithium secondary battery includes a cathode including a cathode active material layer that includes the cathode active material for a lithium secondary battery according to embodiments as described above, and an anode facing the cathode.

A cathode active material precursor for a lithium secondary battery according to embodiments of the present invention contains a high content of nickel and has an XRD peak ratio in a predetermined range. The cathode active material precursor may have improved crystalline structural stability, and thus a crystalline structural stability of the cathode active material synthesized from the cathode active material precursor may be improved.

According to exemplary embodiments, the cathode active material may be generated by reacting the cathode active material precursor and a lithium source, and lithium ions may be inserted while stably maintaining a transition metal-oxygen layered structure. Thus, a layered structure of oxygen-lithium-oxygen and a layered structure of oxygen-transition metal-oxygen may be stably maintained throughout the cathode active material.

Therefore, a high-capacity lithium secondary battery in which chemical and structural stability of the cathode active material may be maintained and a side reaction with the electrolyte may be suppressed even when charging/discharging is repeated at a high temperature may be effectively implemented.

BRIEF DESCRIPTION OF THE DRAWINGS

FIG. 4 is an XRD analysis graph of cathode active material precursors according to Example 1 and Comparative Example 1.

DETAILED DESCRIPTION OF THE EMBODIMENTS

Figure 1:
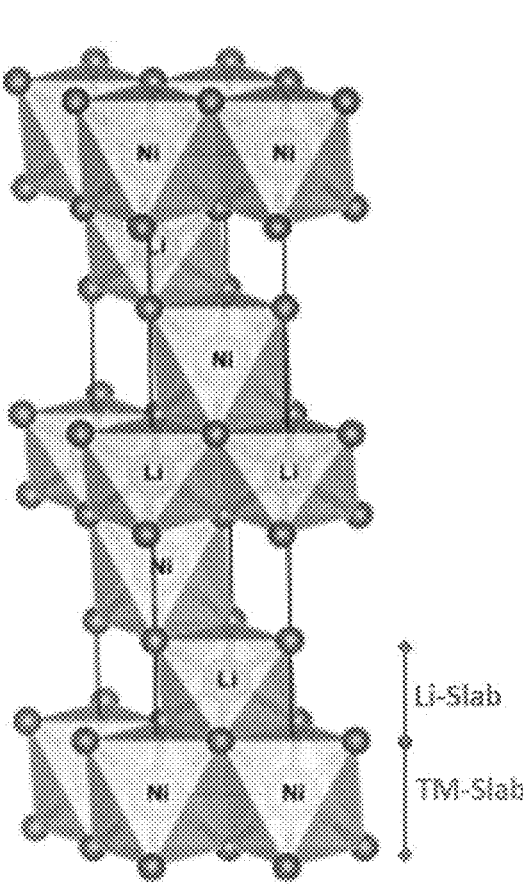
FIG. 1 is a schematic view illustrating a crystalline structure of a cathode active material in accordance with exemplary embodiments.

According to embodiments of the present invention, a cathode active material precursor and a cathode active material for a lithium secondary battery having a high-nickel (high-Ni) composition and having a predetermined crystal structure.

Further, a lithium secondary battery including the cathode active material and having improved high-temperature stability and capacity is provided.

Hereinafter, embodiments of the present invention will be described in detail with reference to exemplary embodiments and the accompanying drawings. However, those skilled in the art will appreciate that such embodiments and drawings are provided to further understand the spirit of the present invention and do not limit subject matters to be protected as disclosed in the detailed description and appended claims.

<Cathode Active Material Precursor and Cathode Active Material for Lithium Secondary Battery>

In exemplary embodiments, a cathode active material precursor for a lithium secondary battery (hereinafter, may be abbreviated as a cathode active material precursor) may be a nickel-based transition metal compound including nickel (Ni) and an additional transition metal.

For example, the additional transition metal may include cobalt (Co), and may further include manganese (Mn) according to some embodiments.

In some embodiments, the nickel-based transition metal compound may be a nickel composite hydroxide that may contain two or more transition metals including nickel.

In exemplary embodiments, Ni may be included in the largest content (molar ratio or atomic %) among elements except for a hydroxyl group in the cathode active material precursor.

For example, the content of Ni may be 0.6 or more, preferably 0.7 or more, more preferably 0.8 or more.

In some embodiments, the cathode active material precursor may be represented by Chemical Formula 1 below.

$$Ni_{1-x-y-z}Co_xMn_yM_z(OH)_{2+a} \qquad \text{Chemical Formula 1}$$

In Chemical Formula 1, $0.02 \le x \le 0.15$, $0 \le y \le 0.15$, $0 \le z \le 0.1$, and $-0.5 \le a \le 0.1$. M may include at least one of Mg, Sr, Ba, B, Al, Si, Ti, Zr and W.

The cathode active material precursor may be formed to have a predetermined peak ratio from an X-ray diffraction (XRD) analysis, which will be described below.

According to embodiments of the present invention, a first peak intensity ratio as expressed by Equation 1 of the cathode active material precursor may be 0.5 or more.

$$\text{first peak intensity ratio} = I(101)/I(001) \qquad \text{Equation 1}$$

According to embodiments of the present invention, a second peak intensity ratio expressed by Equation 2 of the cathode active material precursor may be 0.7 or more.

$$\text{Second peak intensity ratio} = I(101)/I(100) \qquad \text{Equation 2}$$

In Equations 1 and 2, $I(101)$ represents a peak intensity or a maximum height of a peak from a (101) plane by an X-ray diffraction (XRD) analysis of the cathode active material precursor, $I(001)$ represents a peak intensity or a maximum height of a peak from a (001) plane by the XRD analysis. $I(100)$ represents a peak intensity or a maximum height of a peak from a (100) plane by the XRD analysis.

For example, the XRD analysis may be performed using a Cu Kα ray as a light source for a dried powder of the cathode active material precursor in a diffraction angle ($2\theta$) range from 10° to 120°, at a scan rate of 0.0065°/step.

As expressed in Equations 1 and 2, the cathode active material precursor may maintain an $I(101)$ value greater than or equal to a predetermined magnitude compared to those of $I(001)$ and $I(100)$. Accordingly, as will be described later, in the process of synthesizing a cathode active material by reacting a lithium source with the cathode active material precursor, a layered structure may be stably maintained while facilitating insertion/doping of lithium elements.

Additionally, within the range of the peak intensity ratio, the cathode active material precursor may have a stable single phase. Accordingly, collapse and disturbance of the crystal structure of the active material may be prevented during the reaction with the lithium source, and a stable structure of the transition metals including nickel may be maintained.

In a preferable embodiment, the first peak intensity ratio may be 0.6 or more, more preferably 0.7 or more. In a preferable embodiment, the second peak intensity ratio may be 0.8 or more, preferably 0.85 or more, more preferably 0.9 or more.

To promote doping/insertion of the lithium source and maintain structural stability, the first peak intensity ratio and the second peak intensity ratio may satisfy the above-described range and may be maintained as 1.4 or less. For example, the first peak intensity ratio may be 1.3 or less or 1.2 or less, and the second peak intensity ratio may be 1.4 or less.

Hereinafter, a method of preparing the cathode active material precursor according to exemplary embodiments will be described.

In exemplary embodiments, active material metal sources may be prepared. The active material metal sources may include a nickel source, a magnanese source and a cobalt source.

Examples of the nickel source include nickel sulfate ($NiSO_4$), nickel hydroxide ($Ni(OH)_2$), nickel nitrate ($Ni(NO_3)_2$), nickel acetate ($Ni(CH_3CO_2)_2$), a hydrate thereof, etc.

Examples of the manganese source include manganese sulfate ($MnSO_4$), manganese hydroxide ($Mn(OH)_2$), manganese nitrate ($Mn(NO_3)_2$), manganese acetate ($Mn(CH_3CO_2)_2$, a hydrate thereof, etc.

Examples of the cobalt source include cobalt sulfate ($CoSO_4$), cobalt hydroxide ($Co(OH)_2$), cobalt nitrate ($Co(NO_3)_2$), cobalt carbonate ($CoCO_3$), a hydrate thereof.

In a preferable embodiment, nickel sulfate, manganese sulfate and cobalt sulfate may be used as the nickel source, the manganese source and the cobalt source, respectively.

In some embodiments, a compound including Mg, Sr, Ba, B, Al, Si, Ti, Zr or W as an element represented by M in Chemical Formula 1 may be used together. For example, the compound may be a salt (e.g., a carbonate, etc.), a hydroxide or an oxide of the element.

M may be present by substituting a portion of Ni, Co and Mn in a precursor particle as a dopant of the cathode active material precursor, or may be present on a surface of the active material particle as a surface coating material.

For example, a transition metal solution including the above-described active material metal sources may be formed. In exemplary embodiments, when preparing the transition metal solution, a pH may be adjusted to 10 or more, for example, 10 or more and less than 12 using, e.g., ammonia water ($NH_3H_2O$). In the above pH range, the above-described peak intensity ratios may be easily adjusted. In an embodiment, a strong base such as NaOH may be excluded for the pH adjustment.

In some embodiments, an input molar ratio of $NH_3H_2O$ relative to the number of moles of the transition metal (e.g., Ni, Co and Mn) contained in the transition metal solution may be greater than 1, preferably 2 or more, more preferably 3 or more.

In exemplary embodiments, an active material precursor may be obtained by mixing the above-described active material metal sources and reacting by, e.g., a co-precipitation method. For example, the active material precursor may be prepared in the form of nickel-manganese-cobalt hydroxide.

A precipitating agent and/or a chelating agent may be used to promote the co-precipitation reaction. The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate (e.g., $NH_3HCO_3$), etc.

In some embodiments, a temperature of the co-precipitation reaction may be greater than 50° C. and less than 80° C. The co-precipitation reaction may be performed for 30 hours to 80 hours.

In some embodiments, the cathode active material precursor may be obtained by heat-treating the precipitated product. For example, the cathode active material precursor having a stabilized crystal structure may be formed by the heat treatment at a temperature in a range from 80° C. to 150° C. for 10 hours to 30 hours.

In exemplary embodiments, a cathode active material for a lithium secondary battery synthesized using the above-described cathode active material precursor (hereinafter, may be abbreviated as a cathode active material) is provided.

The cathode active material may include a lithium-nickel-based composite oxide. As described above, the cathode active material may further contain cobalt and may further contain manganese. For example, the cathode active material may include nickel-cobalt-manganese (NCM)-based lithium oxide.

As described above, Ni may be included in the largest content (molar ratio or atomic %) among elements except for lithium and oxygen included in the cathode active material.

For example, the content of Ni may be 0.6 or more, preferably 0.7 or more, and more preferably 0.8 or more.

In some embodiments, the cathode active material may include a lithium-nickel-based composite oxide represented by Chemical Formula 2 below.

$$Li_bNi_{1-x-y-z}Co_xMn_yM_zO_{2+a} \quad \text{Chemical Formula 2}$$

In Chemical Formula 2, $0.02 \leq x \leq 0.15$, $0 \leq y \leq 0.15$, $0 \leq z \leq 0.1$, $-0.5 \leq a \leq 0.1$, and $0.9 \leq b \leq 1.2$. M may include at least one element selected from Mg, Sr, Ba, B, Al, Si, Ti, Zr and W.

The cathode active material may include particles of the lithium-nickel-based composite oxide. For example, an amount of the lithium-nickel-based composite oxide particles may be 50 weight percent (wt %) or more based on a total weight of the cathode active material. Preferably, the amount of the lithium-nickel-based composite oxide particles may be 60 wt % or more, 70 wt % or more, 80 wt % or more, or 90 wt % or more based on the total weight of the cathode active material.

In an embodiment, the cathode active material may substantially consist of the particles of the lithium-nickel-based composite oxide.

In exemplary embodiments, an interlayer distance ratio obtained by an XRD analysis of the cathode active material and defined by Equation 3 below may be 0.80 or more.

$$\text{interlayer distance ratio} = TM \text{ slab/Li slab} \quad \text{Equation 3}$$

TM slab is a thickness of a transition metal layer or a thickness of O-TM-O in an octahedral structure ($TMO_6$) containing the transition metal (TM) obtained by an XRD Rietveld Refinement analysis.

Li slab is a thickness of a lithium layer or a thickness of O—Li—O in a Li-containing octahedral structure ($LiO_6$) obtained by the XRD Rietveld Refinement analysis.

TM slab and Li slab may be obtained from a crystal structure analysis by a Rietveld method when a space group R-3m is used in a crystal structure model based on an XRD analysis.

FIG. 1 is a schematic view illustrating a crystalline structure of a cathode active material in accordance with exemplary embodiments. FIG. 1 illustrates Ni as an example of the transition metal included in the TM slab.

When the cathode active material precursor and the lithium source react each other, lithium ions may be doped or intercalated to form the lithium layer. As described above, according to exemplary embodiments, the TM slab may be formed with a predetermined ratio or more relatively to the Li slab. Accordingly, destruction and deformation in the transition metal layer may be prevented while sufficiently achieving a space for lithium ions to be inserted.

Further, the active material precursor according to the above-described exemplary embodiments may be used, so that the interlayer distance ratio may be achieved. Therefore, stability of the crystal structure of the active material according to the slab ratio may be obtained from the precursor formation step.

The XRD peak ratio of the precursor and the interlayer distance ratio of the active material may be controlled in the crystal structure step, so that the layered structure of the active material may be stably maintained even during high-temperature heat treatment or high-temperature charging/discharging.

Thus, even though the high-Ni composition is employed, structural defects such as a cation mixing/cation disorder or a nickel elution may be prevented. Accordingly, life-span properties of the secondary battery may be improved while suppressing a gas generation due to a side reaction with an electrolyte.

In a preferable embodiment, the interlayer distance ratio of Equation 3 may be in a range from 0.81 to 1.0, more preferably from 0.815 to 0.95, or from 0.815 to 0.90.

In some embodiments, TM slab may be in a range from 2.110 Å to 2.140 Å, and Li slab may be in a range from 2.580 Å to 2.620 Å. In a preferable embodiment, TM slab may be in a range from 2.120 Å to 2.140 Å, and Li slab may be in a range from 2.590 Å to 2.610 Å.

Within the above-described TM slab range, the crystal structure deformation due to the lithium ion intercalation may be prevented while maintaining an appropriate distance between the transition metal and oxygen, and the layered structure may be maintained without defects.

Further, within the above-described Li slab range, intercalation/deinrtercalation of lithium may be easily promoted, and a stable lithium layered structure may be maintained, thereby preventing the cation disorder.

The cathode active material precursor according to embodiments of the present invention may be reacted with a lithium source to form the cathode active material.

The lithium source may include, e.g., lithium carbonate ($Li_2CO_3$), lithium nitrate ($LiNO_3$), lithium acetate ($CH_3COOLi$), lithium oxide ($Li_2O$), lithium hydroxide ($LiOH$), etc. These may be used alone or in a combination thereof. Preferably, lithium hydroxide may be used as the lithium source.

For example, the cathode active material precursor may be mixed with the lithium source and a calcination may be performed to prepare lithium-nickel-based composite oxide particles as the cathode active material. For example, the calcination may be performed at a temperature ranging from about 600° C. to 850° C., preferably from 750° C. to 850° C.

In some embodiments, a washing process may be further performed on the lithium-nickel-based composite oxide particles generated as the cathode active material. The washing process may include washing with an aqueous or organic solvent. Lithium impurities (e.g., $Li_2O$, $Li_2CO_3$, etc.) remaining on the surface of the lithium-nickel-based composite oxide particles may be removed by the washing process.

In an embodiment, after the washing process, a post-calcination process may be further performed. The post-calcination process may be performed, e.g., at a temperature ranging from about 250° C. to 500° C.

The crystal stricture on the surface of the cathode active material may be further stabilized by the post-calcination process, and the above-described interlayer distance ratio may be uniformly maintained.

<Lithium Secondary Battery>

According to embodiments of the present invention, a lithium secondary battery including a cathode that includes the above-described cathode active material for a lithium secondary battery is provided.

Figure 2:
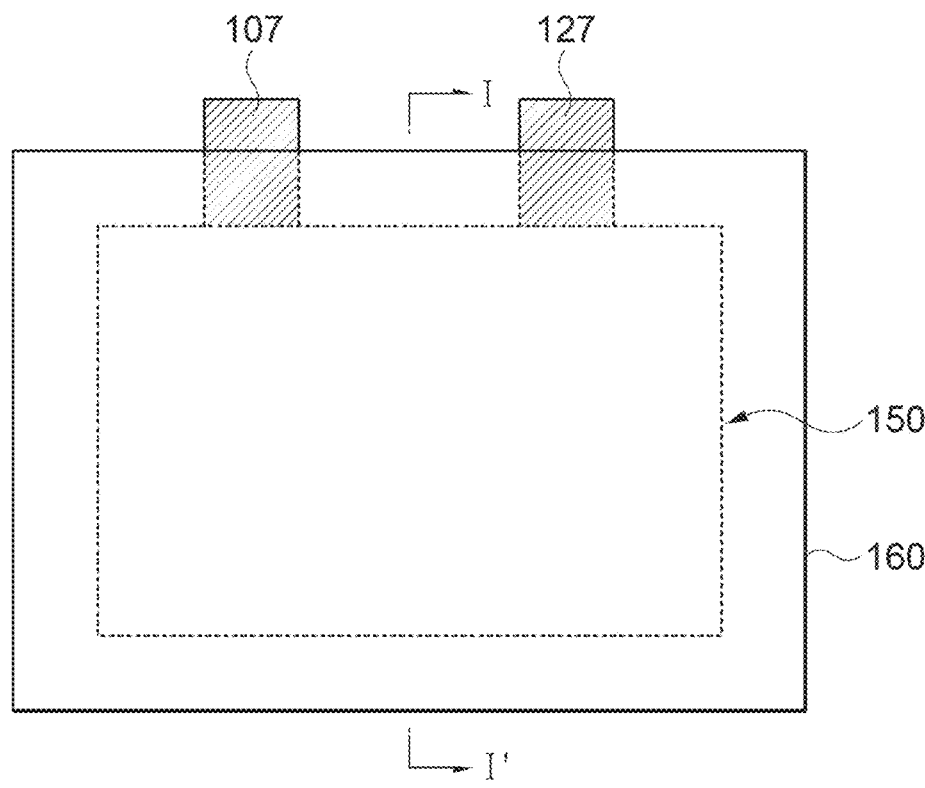
FIGS. 2 and 3 are a schematic plan view and a cross-sectional view, respectively, illustrating a lithium secondary battery in accordance with exemplary embodiments.
Figure 3:
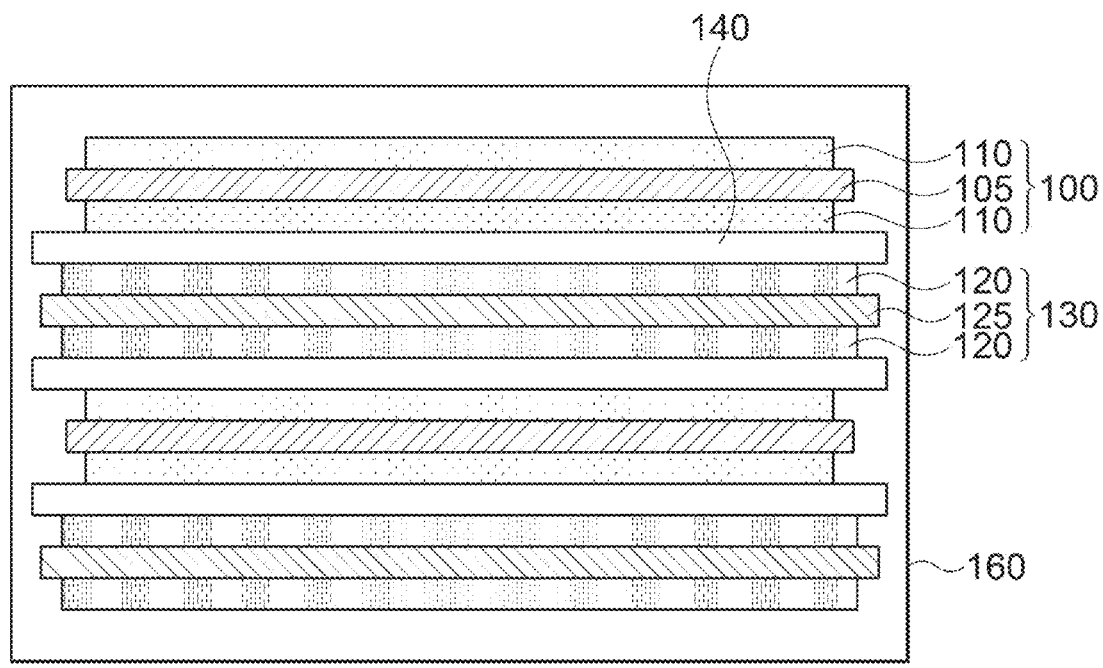

FIGS. 2 and 3 are a schematic plan view and a cross-sectional view, respectively, illustrating a lithium secondary battery in accordance with exemplary embodiments.

Referring to FIGS. 2 and 3, the lithium secondary battery may include a cathode 100 including a cathode active material layer that includes the above-described cathode active material for a lithium secondary battery, and an anode 130 facing the cathode.

The cathode 100 may include a cathode active material layer 110 formed by coating the cathode active material on a cathode current collector 105.

For example, a slurry may be prepared by mixing and stirring the above-described cathode active material with a binder, a conductive material and/or a dispersive agent in a solvent. The slurry may be coated on the cathode current collector 105, and then dried and pressed to from the cathode.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon (Si)-based compound, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc.

The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The silicon-based compound may include, e.g., silicon, silicon oxide (e.g., $SiOx$, $0<x<2$), or a silicon-carbon composite compound such as silicon carbide (SiC).

The anode current collector 125 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those mentioned above may also be used in the anode 130. In some embodiments, the binder for forming the anode 130 may include an aqueous binder such as styrene-butadiene rubber (SBR), and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding of the separation layer 140.

The electrode assembly 150 may be accommodated together with an electrolyte in an outer case 160 to define the lithium secondary battery. In exemplary embodiments, a non-aqueous electrolyte may be used as the electrolyte.

The non-aqueous electrolyte may include a lithium salt and an organic solvent. The lithium salt may be represented by, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125, respectively, included in each electrode cell to one side of the outer case 160. The electrode tabs may be welded together with the one side of the outer case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

In exemplary embodiments, lithium-nickel composite metal oxide particles containing nickel in a high content and maintaining the interlayer distance ratio in the above-described crystal structure may be used. Accordingly, the cathode active material may have improved chemical stability while cation mixing/defects may be suppressed, so that the lithium secondary battery having improved capacity, life-span and long-term stability may be achieved.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Cathode Active Material Precursor $NiSO_4$, $CoSO_4$ and $MnSO_4$ were mixed in a molar ratio of 8:1:1, respectively, using distilled water from which dissolved oxygen was removed by bubbling with $N_2$ for 24 hours. The solution was put into a reactor at 70° C., and $NH_3H_2O$ was input while stirring at a constant speed so that a pH became 10.5. NaOH was introduced into the reactor at a constant rate so that a molar ratio of transition metals in the prepared transition metal solution and NaOH became 1:2. $NH_3H_2O$ was added to 4 times or more of the number of moles of the transition metals in the process above, and a co-precipitation reaction was performed for 48 hours to prepare a preliminary active material precursor.

The preliminary active material precursor was heat-treated in an oven at 120° C. for 10 hours to obtain a cathode active material precursor.

(2) Preparation of Cathode Active Material

The above-obtained cathode active material precursor and lithium hydroxide were mixed in a molar ratio of 1:1.05, and then calcined at 700° C. for 20 hours under an oxygen atmosphere. Thereafter, a pulverization, a washing and a post-calcination at 300° C. were performed to form a cathode active material in the form of lithium-nickel composite oxide particles.

(3) Fabrication of Secondary Battery

Secondary batteries were prepared using the cathode active materials of Examples and Comparative Examples as shown in Table 1. Specifically, a cathode mixture was prepared by mixing the cathode active material, Denka Black as a conductive material, and PVDF as a binder in a mass ratio of 94:3:3, respectively. The cathode mixtures coated on an aluminum current collector, dried and pressed to prepare a cathode. An electrode density of the cathode was adjusted to 3.5 g/cc or more after the pressing 93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M LiPF$_6$ solution in a mixed solvent of ethylene carbonate (EC)/ethyl methyl carbonate (EMC)/diethylene carbonate (DEC) (25/45/30; volume ratio), and then 1 wt % of vinylene carbonate, 0.5 wt % of 1,3-propensultone (PRS) and 0.5 wt % of lithium bis(oxalato)borate (LiBOB) were added.

Example 2

A precursor, an active material and a secondary battery were prepared by the same method as that in Example 1, except that NiSO$_4$, CoSO$_4$ and MnSO$_4$ were mixed so that the Ni:Co:Mn ratio was 90:5:5 during the preparation of the precursor.

Example 3

A precursor, an active material and a secondary battery were prepared by the same method as that in Example 1, except that the reaction temperature was changed to 55° C. and the molar ratio of the transition metal and NaOH was changed to 1:0.5 during the preparation of the precursor.

Comparative Example 1

A precursor, an active material and a secondary battery were prepared by the same method as that in Example 1, except that the reaction temperature was changed to 75° C.

and the molar ratio of the transition metal to NH$_3$H$_2$O was changed to 1:2 during the preparation of the precursor.

Comparative Example 2

A precursor, an active material and a secondary battery were prepared by the same method as that in Example 1, except that the reaction temperature was changed to 75° C. and the molar ratio of the transition metal and NaOH was changed to 1:2 during the preparation of the precursor.

Comparative Example 3

A precursor, an active material and a secondary battery were prepared by the same method as that in Example 1, except that a temperature of the heat-treatment (calcination) was changed to 800° C. during the preparation of the active material.

Experimental Example (1) XRD Analysis

Peak intensities and peak intensity ratios of the cathode active material precursors of Examples and Comparative Examples were calculated using an XRD equipment.

Specific XRD analysis equipment/conditions were shown in Table 1 below.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

TM slabs and Li slabs of the cathode active materials according to Examples and Comparative Examples were obtained from a crystal structure analysis by a Rietveld method when a space group R-3m was used in a crystal structure model based on the above XRD analysis equipment.

Figure 4:
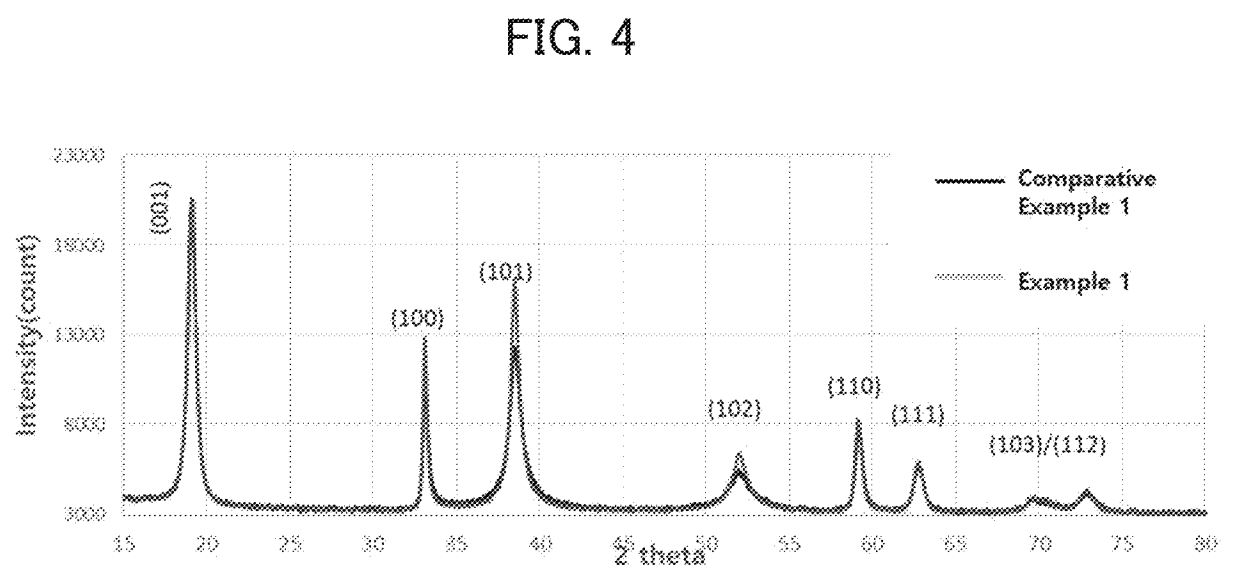

The results are shown in Table 2. FIG. 4 is an XRT analysis graph of cathode active material precursors according to Example 1 and Comparative Example 1.

TABLE 2

| | Example 1 | Example 2 | Example 3 | Comparative Example 1 | Comparative Example 2 | Comparative Example 3 |
|---|---|---|---|---|---|---|
| I(001) | 10588 | 11627 | 10001 | 11118 | 2109 | 9109 |
| I(100) | 7017 | 7383 | 8656 | 8244 | 2871 | 5871 |
| I(101) | 6526 | 8307 | 11883 | 5096 | 1437 | 5437 |
| first peak intensity ratio (I(101)/I(001)) | 0.62 | 0.71 | 1.19 | 0.46 | 0.68 | 0.60 |
| second peak intensity ratio (I(101)/I(100)) | 0.93 | 1.13 | 1.37 | 0.62 | 0.50 | 0.93 |
| TM slab (Å) | 2.124 | 2.135 | 2.140 | 2.118 | 2.131 | 2.154 |
| Li slab (Å) | 2.604 | 2.594 | 2.590 | 2.261 | 2.594 | 2.754 |
| interlayer distance ratio (TM slab/Li slab) | 0.816 | 0.823 | 0.826 | 0.937 | 0.822 | 0.782 |

Experimental Example 2

(1) Measurement of Initial Capacity and Evaluation on Initial Efficiency

The lithium secondary batteries prepared according to Examples and Comparative Examples were charged (CC-CV 0.1C 4.3V 0.005C CUT-OFF) in a chamber at 25° C. and a battery capacity initial charge capacity) was measured. The batteries were discharged again (CC 0.1C 3.0V CUT-OFF) and a battery capacity (an initial discharge capacity) was measured.

An initial capacity efficiency was evaluated by converting a value obtained by dividing the initial discharge capacity by the initial charge capacity as a percentage (%).

(2) Measurement of Capacity Retention (Life-Span Property) During Repeated Charge and Discharge 120 cycles of charging (CC/CV 0.5C 4.3V 0.05C CUT-OFF) and discharging (CC 11.0C 3.0V CUT-OFF) were repeated at 60° C. for the lithium secondary batteries according to Examples and Comparative Examples. A discharge capacity retention was evaluated as a percentage of a discharge capacity at the 120th cycle relative to a discharge capacity at the 1st cycle.

The evaluation results are shown in Table 3 below.

TABLE 3

| | initial charge capacity (mAh/g) | initial discharge capacity (mAh/g) | initial efficiency (%) | discharge capacity retention 60° C. (%) |
|---|---|---|---|---|
| Example 1 | 232 | 208 | 90 | 87 |
| Example 2 | 237 | 218 | 92 | 82 |
| Example 3 | 234 | 209 | 89 | 91 |
| Comparative Example 1 | 234 | 207 | 88 | 72 |
| Comparative Example 2 | 230 | 189 | 82 | 85 |
| Comparative Example 3 | 237 | 216 | 91 | 52 |

Referring to Table 3, in Examples satisfying the above-described peak intensity ratio of the precursor and the interlayer distance ratio of the active material, stable crystal structure and layered structure were maintained to provide improved efficiency and capacity stability.

What is claimed is:

1. A cathode active material precursor for a lithium secondary battery having a structure of a nickel composite hydroxide, wherein the nickel composite hydroxide includes Ni, Co and Mn, and further includes at least one of Mg, Sr, Ba, B, Al, Si, Ti, Zr and W, wherein a first peak intensity ratio represented by Equation 1 is 0.7 or more, and a second peak intensity ratio represented by Equation 2 is in a range from 0.7 to 1.4:

$$\text{First peak intensity ratio} = I(101)/I(001) \qquad \text{[Equation 1]}$$

$$\text{Second peak intensity ratio} = I(101)/I(100) \qquad \text{[Equation 2]}$$

wherein, in Equations 1 and 2, I(101), I(001) and I(100) are peak intensities or maximum peak heights of (101), (001) and (100) planes, respectively, by an X-ray diffraction analysis.

2. The cathode active material precursor for a lithium secondary battery of claim 1, wherein the structure of the nickel composite hydroxide is represented by Chemical Formula 1:

$$Ni_{1-x-y-z}CO_xMn_yM_z(OH)_{2+a} \qquad \text{[Chemical Formula 1]}$$

wherein, in Chemical Formula 1, M includes at least one selected from the group consisting of Mg, Sr, Ba, B, Al, Si, Ti, Zr and W, $0.02 \leq x \leq 0.15$, $0 \leq y \leq 0.15$, $0 \leq z \leq 0.1$, and $-0.5 \leq a \leq 0.1$.

3. The cathode active material precursor for a lithium secondary battery of claim 1, wherein a molar ratio of nickel among elements other than a hydroxyl group is 0.8 or more.

4. The cathode active material precursor for a lithium secondary battery of claim 1, wherein the first peak intensity ratio is in a range from 0.75 to 1.3.

* * * * *